(12) United States Patent
Arnold et al.

(10) Patent No.: US 11,803,773 B2
(45) Date of Patent: Oct. 31, 2023

(54) MACHINE LEARNING-BASED ANOMALY DETECTION USING TIME SERIES DECOMPOSITION

(71) Applicant: EMC IP Holding Company LLC, Hopkinton, MA (US)

(72) Inventors: Zachary W. Arnold, Concord, MA (US); Bina K. Thakkar, Cary, NC (US); Peter Beale, Acton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 669 days.

(21) Appl. No.: 16/526,103

(22) Filed: Jul. 30, 2019

(65) Prior Publication Data
US 2021/0035011 A1 Feb. 4, 2021

(51) Int. Cl.
G06F 11/07 (2006.01)
G06F 11/30 (2006.01)
G06N 20/00 (2019.01)

(52) U.S. Cl.
CPC ......... G06N 20/00 (2019.01); G06F 11/0709 (2013.01); G06F 11/0721 (2013.01); G06F 11/0754 (2013.01); G06F 11/3006 (2013.01); G06F 11/3072 (2013.01)

(58) Field of Classification Search
CPC ............ G06F 11/0781; G06F 11/3006; G06F 11/3072; H04L 43/08; H04L 43/0823; H04L 43/0852
See application file for complete search history.

(56) References Cited

U.S. PATENT DOCUMENTS

| 7,028,158 B1* | 4/2006 | Beatty | G06F 11/3442 711/202 |
| 7,783,510 B1* | 8/2010 | Gilgur | G06Q 10/06315 705/7.31 |
| 7,904,330 B2 | 3/2011 | Uyama et al. | |
| 9,323,599 B1* | 4/2016 | Iyer | G06F 9/45508 |

(Continued)

OTHER PUBLICATIONS

Wikipedia, "File Server", Mar. 2019. (Year: 2019).*
Dell EMC, Dell EMC Unity: Introduction to the Platform, White Paper, Jun. 2019.

*Primary Examiner* — Gabriel Chu
(74) *Attorney, Agent, or Firm* — Ryan, Mason & Lewis, LLP

(57) ABSTRACT

Methods, apparatus, and processor-readable storage media for machine learning-based anomaly detection using time series decomposition are provided herein. An example computer-implemented method includes processing, via machine learning techniques pertaining to time series decomposition functions, a first set of historical time series data derived from multiple systems within an enterprise; generating, based on the processed data, one or more pairs of upper bounds and lower bounds directed to system metrics; identifying system anomalies attributed to one or more of the multiple systems within the enterprise by comparing a second set of historical time series data derived from the one or more systems against the one or more pairs of upper bounds and lower bounds; prioritizing, via machine learning techniques pertaining to weighting functions, the system anomalies; and outputting, in accordance with the prioritization, the system anomalies to a user within the enterprise.

20 Claims, 4 Drawing Sheets

(56) References Cited

U.S. PATENT DOCUMENTS

| | | | |
|---|---|---|---|
| 10,102,056 B1* | 10/2018 | Goldberg | G06F 9/45558 |
| 10,248,533 B1 | 4/2019 | Shah et al. | |
| 10,972,491 B1* | 4/2021 | Guha | H04L 63/1425 |
| 10,990,891 B1* | 4/2021 | Atay | G06F 17/11 |
| 2003/0191909 A1* | 10/2003 | Asano | G06F 11/3433 |
| | | | 711/156 |
| 2005/0259683 A1* | 11/2005 | Bishop | H04L 41/5009 |
| | | | 370/468 |
| 2006/0047807 A1 | 3/2006 | Magnaghi et al. | |
| 2009/0018798 A1* | 1/2009 | Dorneich | G06F 17/18 |
| | | | 702/179 |
| 2011/0119374 A1* | 5/2011 | Ruhl | H04L 43/04 |
| | | | 709/224 |
| 2013/0110761 A1* | 5/2013 | Viswanathan | G06F 16/24578 |
| | | | 706/52 |
| 2014/0108640 A1* | 4/2014 | Mathis | H04L 63/1425 |
| | | | 709/224 |
| 2016/0065604 A1* | 3/2016 | Chen | H04L 63/1425 |
| | | | 726/23 |
| 2016/0147583 A1* | 5/2016 | Ben Simhon | G06F 11/076 |
| | | | 714/47.3 |
| 2016/0350173 A1* | 12/2016 | Ahad | G06F 11/0793 |
| 2016/0371170 A1* | 12/2016 | Salunke | G06F 11/302 |
| 2017/0070414 A1* | 3/2017 | Bell | H04L 43/16 |
| 2017/0314961 A1 | 11/2017 | Chen et al. | |
| 2018/0039898 A1* | 2/2018 | Saini | G06F 21/554 |
| 2018/0136994 A1* | 5/2018 | Toledano | G06F 11/327 |
| 2018/0176241 A1* | 6/2018 | Manadhata | H04L 67/02 |
| 2018/0247215 A1* | 8/2018 | Garvey | G06N 5/045 |
| 2018/0324199 A1* | 11/2018 | Crotinger | H04L 63/1425 |
| 2019/0034102 A1* | 1/2019 | Miller | G06F 12/023 |
| 2019/0129821 A1* | 5/2019 | Lee | G06F 17/15 |
| 2019/0138643 A1 | 5/2019 | Saini et al. | |
| 2019/0311297 A1* | 10/2019 | Gapper | G06N 7/005 |
| 2020/0210264 A1* | 7/2020 | Lavrentyev | G06F 11/076 |
| 2020/0264965 A1* | 8/2020 | Harutyunyan | G06N 20/00 |

* cited by examiner

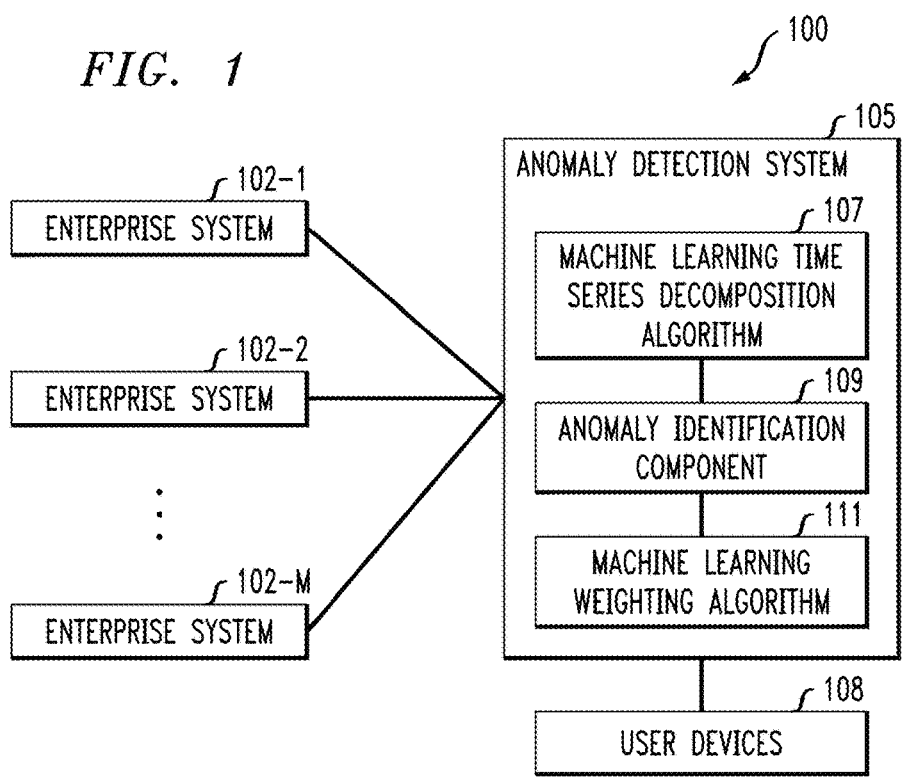

```
Input: time series data for last 22 days
Output: Lower and upper anomaly bounds for last 24 hours
Method:
# Check if there is enough data
if data points < 14 days
            insufficient data, cannot calculate anomaly bounds, return
if there are missing data points
            interpolate missing data points
extract seasonality, trend and error for data
lower bound = min error + seasonality + trend
expanded lower bound = 3 * standard deviation + lower bound
upper bound = max error + seasonality + trend
expanded upper bound = 3 * standard deviation + upper bound
return expanded lower bounds and expanded upper bounds
```

MACHINE LEARNING-BASED ANOMALY DETECTION USING TIME SERIES DECOMPOSITION

FIELD

The field relates generally to information processing systems, and more particularly to techniques for processing time series data in such systems.

BACKGROUND

When application performance degrades as a result of contention on an underlying system, it can often be challenging to determine what, with respect to the system, has changed. For example, such challenges can include difficulties in accurately determining certain performance metrics at specific points in time. Commonly, conventional anomaly detection approaches simply highlight individual metric points, which leaves challenges in understanding and/or determining why a particular point has been identified.

SUMMARY

Illustrative embodiments of the disclosure provide techniques for machine learning-based anomaly detection using time series decomposition. An exemplary computer-implemented method includes processing, via one or more machine learning techniques pertaining to at least one time series decomposition function, a first set of historical time series data derived from multiple systems within an enterprise, wherein the first set of historical time series data encompasses a first temporal period. Such a method also includes generating, based at least in part on the processed first set of historical time series data, one or more pairs of upper bounds and lower bounds directed to one or more system metrics, wherein each upper bound and lower bound pair defines a range for a given one of the system metrics over the first temporal period. Additionally, such a method includes identifying one or more system anomalies attributed to one or more of the multiple systems within the enterprise by comparing a second set of historical time series data derived from the one or more systems against the one or more pairs of upper bounds and lower bounds, wherein the second set of historical time series data encompasses a second temporal period that is different than the first temporal period. Further, such a method also includes prioritizing, via one or more machine learning techniques pertaining to at least one weighting function, the one or more identified system anomalies, and outputting, in accordance with the prioritization, at least a portion of the one or more identified system anomalies to at least one user within the enterprise.

Illustrative embodiments can provide significant advantages relative to conventional anomaly detection approaches. For example, challenges associated with accurately determining certain metrics at specific points in time are overcome through time series decomposition of system data.

These and other illustrative embodiments described herein include, without limitation, methods, apparatus, systems, and computer program products comprising processor-readable storage media.

BRIEF DESCRIPTION OF THE DRAWINGS

FIG. 1 shows an information processing system configured for machine learning-based anomaly detection using time series decomposition in an illustrative embodiment.

FIG. 2 shows example pseudocode for machine learning-based anomaly detection using time series decomposition in an illustrative embodiment.

DETAILED DESCRIPTION

Figure 3:
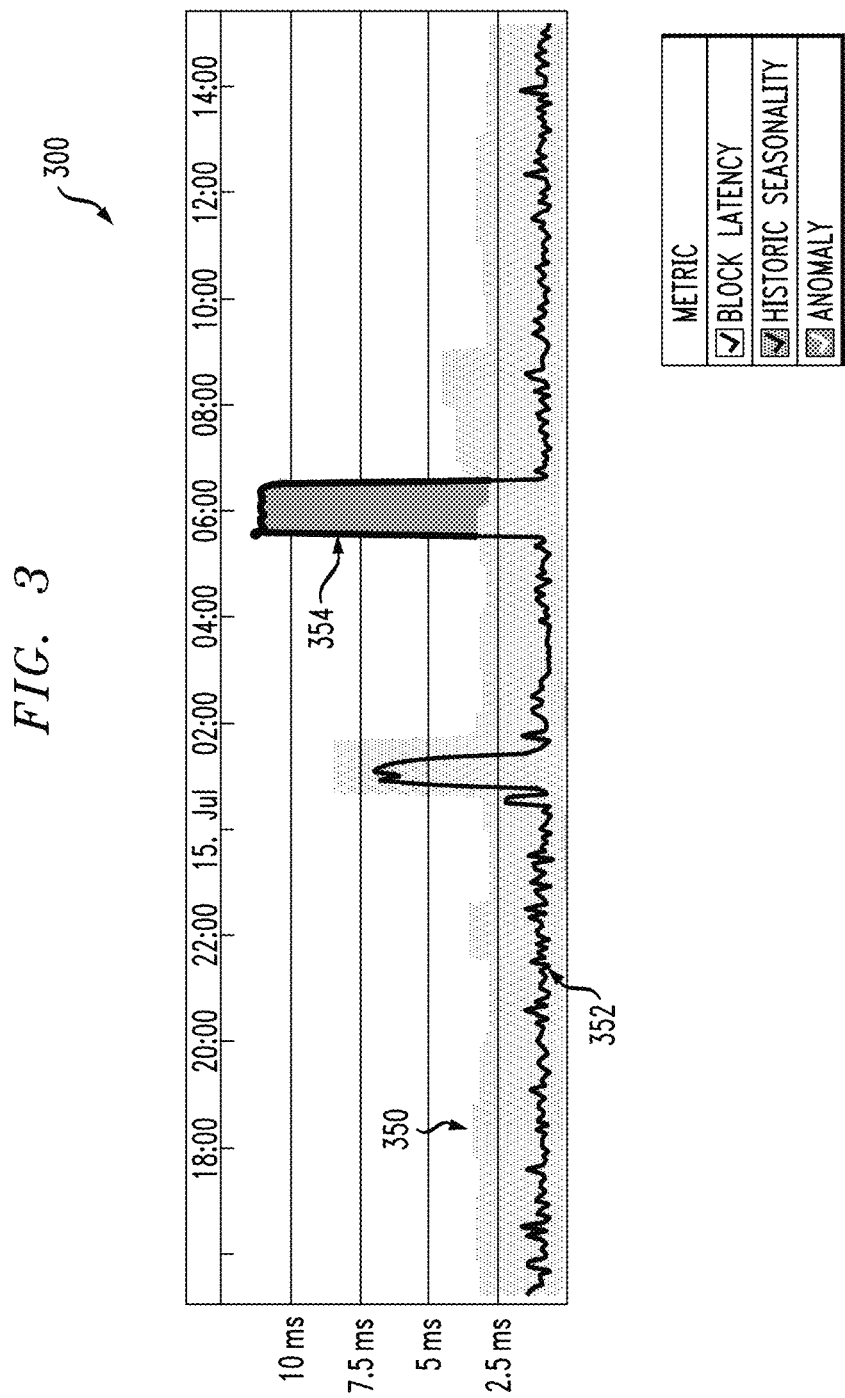
FIG. 3 shows an example output in an illustrative embodiment.

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

FIG. 1 shows a computer network (also referred to herein as an information processing system) 100 configured in accordance with an illustrative embodiment. The computer network 100 comprises a plurality of enterprise systems 102-1, 102-2, . . . 102-M, collectively referred to herein as enterprise systems 102. The enterprise systems 102 are coupled to a network, where the network in this embodiment is assumed to represent a sub-network or other related portion of the larger computer network 100. Also coupled to the network is anomaly detection system 105 and user devices 108, which can be coupled to the anomaly detection system 105.

The enterprise systems 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The enterprise systems 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Each of the enterprise systems 102 and anomaly detection system 105 in the FIG. 1 embodiment is assumed to be implemented using at least one processing device. Each such processing device generally comprises at least one processor and an associated memory, and implements one or more functional modules for controlling certain features of the enterprise system 102 or anomaly detection system 105.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The anomaly detection system 105 further comprises a machine learning time series decomposition algorithm 107, an anomaly identification component 109, and a machine learning weighting algorithm 111.

It is to be appreciated that this particular arrangement of modules 107, 109 and 111 illustrated in the anomaly detection system 105 of the FIG. 1 embodiment is presented by way of example only, and alternative arrangements can be used in other embodiments. For example, the functionality associated with the modules 107, 109 and 111 in other embodiments can be combined into a single module, or separated across a larger number of modules. As another example, multiple distinct processors can be used to implement different ones of the modules 107, 109 and 111 or portions thereof.

It is to be understood that the particular set of elements shown in FIG. 1 for machine learning-based anomaly detection using time series decomposition involving enterprise systems 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing machine learning time series decomposition algorithm 107, anomaly identification component 109, and machine learning weighting algorithm 111 of an example anomaly detection system 105 in computer network 100 will be described in more detail with reference to the flow diagram of FIG. 4.

Accordingly, at least one embodiment of the invention includes machine learning-based anomaly detection using time series decomposition. Storage systems commonly strive to balance the demands of many workloads, each with their own unique storage profile. Such workloads often share the various resources of the storage systems, such as front-end and back-end adapters, storage processors, disks, etc.

One or more embodiments including generating and implementing an anomaly detection algorithm that provides upper and lower bounds that define a range for a given metric. Any time the given metric exceeds the calculated bounds, such an embodiment includes detecting and flagging the instance as an anomaly. To create such bounds, at least one embodiment includes using a time series decomposition function to isolate seasonality information, trend information, and error components from the relevant input data. The isolated information is combined to determine and/or create the upper and lower bounds. In one or more embodiments, the upper bound and lower bound are determined based at least in part on the maximum and minimum error component observed historically at a given time of day and day of week, respectively. Also, in such an embodiment, the bounds enable efficient determination of whether a system and/or user is experiencing new behavior with respect to the relevant metric(s), and also enable reductions in the time required to address one or more related issues (e.g., performance issues).

In at least one embodiment, a machine learning algorithm is tuned using anonymized data from one or more systems. The tuning results in bounds that are scaled by their standard deviation to ensure that any detected anomalies are statistically significant. Additionally, one or more embodiments include incorporating data cleaning methods such as, for example, interpolation to handle situations wherein data are missing and also to determine when insufficient data are present to run the algorithm.

At least one embodiment also includes prioritizing certain detected anomalies over other (less significant) detected anomalies. For example, some identified anomalies can be minor in scope or importance, but merely identifying all anomalies in a binary matter may render such minor anomalies indistinguishable from more consequential anomalies. Accordingly, at least one embodiment includes calculating (in connection with the determined bounds) the area of each detected anomaly, wherein such calculations yield respective weights for each detected anomaly that can be used to compare the significance of such anomalies across one or more metrics and/or across one or more systems to determine and/or learn the impacts of such anomalies to one or more storage environments.

Additionally, as detailed herein, one or more embodiments include rendering anomaly detection less computationally intensive via implementing incremental time series decomposition. By way merely of example, one such embodiment can include utilizing input data to the algorithm in the form of the prior 22 days of relevant data (e.g., performance data, storage-related data, etc.), and then analyzing the past 24 hours of relevant data against the determined upper and lower bounds (calculated based at least in part on the prior 22 days of relevant data). Further, in at least one embodiment, trend information is forecasted and, as such, anomalies can be detected in real-time (against the forecasted upper and lower bounds) across one or more storage environments.

FIG. 2 shows example pseudocode for machine learning-based anomaly detection using time series decomposition in an illustrative embodiment. In this embodiment, pseudocode 200 is executed by or under the control of a processing system, such as anomaly detection system 105, or another type of processing system. For example, the pseudocode 200 may be viewed as comprising a portion of a software implementation of at least part of modules 107, 109 and/or 111 of the FIG. 1 embodiment.

The pseudocode 200 illustrates application of machine learning techniques to input data that include time series data for a period comprising the previous 22 days, resulting in the generation of lower and upper anomaly detection bounds for use in analyzing a separate set of data (e.g., time series data for a period comprising the previous 24 hours). Accordingly, pseudocode 200 shows steps for taking the time series data as input and producing the set of bounds for the most recent 24 hours of data, which will be analyzed to determine if one or more anomalies have occurred where the data has exceeded the bounds. The algorithm illustrated via pseudocode 200 uses a time series decomposition function to isolate the seasonality, trend(s) and error(s) in the provided data, and uses this error to generate the bounds. These bounds are then scaled-out by their standard deviation in order to ensure detected anomalies are sufficiently significant.

It is to be appreciated that this particular pseudocode shows just one example implementation of a process for machine learning-based anomaly detection using time series decomposition, and alternative implementations of the process can be used in other embodiments.

FIG. 3 shows an example user output in an illustrative embodiment. By way of illustration, FIG. 3 depicts a graph 300 of anomaly detection with respect to a block latency metric. As illustrated, the graph 300 depicts the bounds 350 (i.e., the lightly shaded area) calculated for the block latency metric, and the data being analyzed 352 (i.e., the solid line) against the bounds 350. Further, graph 300 depicts an identified anomaly 354 (i.e., the darker shaded area) wherein the data 352 exceeds the bounds 354.

In one or more embodiments, various types of data can be utilized for determining bounds and detecting anomalies. By way merely of example, such data can include health scores, configuration data, capacity data, and performance data. Health score information can include values and/or information pertaining to the health of the system, including the total number of issues, a breakdown of each health score category, an issues list showing the issues for a selected category and a remediation for each issue, and a health score history chart that displays events for a selected time range. Additionally, health score information can also include a health score history graph, which enables selection of a custom time range for reviewing how past health issues impacted the health score, and also displays a current description of which issues need attention.

Configuration data can include, for example, the name of the system, the serial number of the system, the amount of time storage processor A (SP A) has been up, the internet protocol version 4 (IPv4) address of the system, the model of the system, the amount of time storage processor B (SP B) has been up, the internet protocol version 6 (IPv6) address of the system, location information for the system, the software version of the system, the expiration date for the system's service contract, the install base site identifier (SiteID) for the system, the last time data was received from the system, the type of the system's service contract, lists all hotfixes that have been applied to the current software version, and the number for the system's service contract.

Configuration data can also include data pertaining to pools, storage objects, virtual machines, drives, and hosts on the given system. Information related to pools on the system can include, for example, the number of issues present on the pool, the name of the pool, the size of the pool, the percentage of pool capacity currently being used, the percentage of pool capacity provisioned, the time until there is no more space remaining on the pool, and the available capacity. Information related to storage objects on the system can include, for example, the number of issues present on the storage object, the name of the storage object, the type of storage object, the total provisioned capacity of the storage object, the used capacity of the storage object, the capacity consumed by the storage object, whether the storage object has thin provisioning enabled, the percentage of data reduction calculated, the name of the pool in which the storage object is included, the name of the consistency group in which the storage object is included, the host input/output (I/O) limits imposed on the storage object, the network attached storage (NAS) server that hosts the storage object, and the time until there is no more space remaining on the pool in which the storage object is included.

Information related to virtual machines connected to the system can include, for example, the name of the virtual machine, the IPv4 or IPv6 addresses, domain names, or netgroup name associated with the virtual machine, the virtual machine operating system, the hostname or IP address of the hypervisor hosting this virtual machine, and the name of the cluster containing the virtual machine. Information related to physical drives on the system can include, for example, the number of issues present on the drive, the enclosure number and disk number of the drive, drive connectivity, the usable capacity of the drive, a prediction, in number of days left, when the flash drive will reach the specified write endurance and need to be replaced based on the usage history of the drive, the percentage of write endurance remaining based on the specified maximum write endurance of the flash drive, the storage tier where the drive resides, the pool where the drive resides, the RAID configuration of the drive, the firmware version of the drive, the part number for the drive, and the rotational speed of the drive. Information related to hosts connected to the system can include, for example, the number of issues present on the host, the host name, a description of the host, IPv4 or IPv6 IP addresses, domain names, or netgroup name associated with the host, the host operating system, the type of initiator that the host uses to connect to the monitored system, the number of initiators connected between the host and the monitored system, and the total size of all logical unit numbers (LUNs) provisioned to the host from the system.

Capacity data can include the amount of capacity used and free on the system, a list of pools on the system and the utilization percentage and time to full for each pool, the amount of capacity used by each drive type installed on the system, the amount of capacity used by the storage objects on the system, and a list of file systems and the utilization percentage and time to full for each file system. More specifically, capacity data can include, for example, used space, free space, unconfigured drive space, capacity savings information, the total capacity allocated to objects in the system that is visible to hosts attached to the system, the used capacity visible to hosts attached to the system, the system-level storage efficiency ratio, the storage efficiency ratio of thin provisioned storage objects on the system, the storage efficiency ratio of snapshots on the system, the storage efficiency ratio of data which have data reduction (which includes savings from compression and deduplication) applied to it on the system, the capacity consumed by various storage objects, the list of drive types in the system with subgroups for configured and unconfigured drives, and historical file system capacity data and the predicted date to full.

Performance data can include, for example, graphs of the top performing storage objects on the system, as well as average, maximum, minimum, and aggregate values for system performance metrics. Such graphs can display the normal range of activity, identify anomalies (if present), and provide historical views of configuration changes over time. Performance data can also include storage object activity and system metrics. Storage object activity can include, for example, lists of storage objects sorted by their 24-hour averages for metrics such as block latency, input/output operations per second (TOPS), and bandwidth. For each of these metrics, additional information can be determined and/or provided, including object name, 24-hour trend, and the 24-hour average for the metric. System metrics can include, for example, graphs of a 24-hour history of system performance metrics, including block latency, IOPS, bandwidth, SP A utilization, SP B utilization, and backend IOPS. Additionally, in at least one embodiment, each metric graph can be filtered by the metric itself and, if applicable, historic seasonality, configuration changes, anomaly, and performance impacts.

With respect to historic seasonality, each graph displays the historical metric value with a line, and a given area is defined by the upper and lower bounds of the normal behavior of this specific metric. The bounds that define the normal behavior are determined, as detailed in connection with one or more embodiments, by analyzing approximately the prior 3-week history of the metric to understand its seasonal information, trend information, and random composition.

Further, in at least one embodiment, based on this composition and some offset in time and value to accept minor differences, each five-minute value of the upper and lower bounds are defined and graphed as an area that contains all values within the normal range. This range is specific to each metric and is determined multiple times (e.g., each time a given page is refreshed). Values that are outside of the range define an area above or below the range, and represent a time range and value of an anomaly.

Selecting a point-in-time or a range of time on a block latency graph (such as the example graph 300 in FIG. 3, for example) displays metric information for five block storage objects with the highest average block latency per I/O for that time range. Selecting a point-in-time or a range of time on an IOPS or bandwidth graph displays metric information for the top five block or file storage objects with the highest time averaged IOPS or bandwidth for that time range.

Configuration changes shown in performance graphs enable a user to associate performance with system configuration. If performance anomalies occur, at least one embodiment can include relating those anomalies with one or more configuration changes. In one or more example embodiments, each graph reflects the performance for the past 24 hours, and for each one-hour time interval within that 24-hour time period, a bar displayed underneath the performance graph indicates that at least one configuration change occurred. Changes include all create, delete, and modify events on the system in that one-hour time interval. If a bar is not displayed underneath a graph for a one-hour time interval, then no configuration changes occurred during that time.

With respect to performance impact detection, in one or more example embodiments, on a block latency graph, if a performance impact occurred in the last 24 hours, the region with the performance impact will be highlighted. The graph's footer can indicate the number of performance impacts found. In such an example embodiment, a performance impact is identified when there is a significant rise in latency with indications of a drop in performance, such as a drop in IOPS.

With respect to anomaly detection, in at least one embodiment, a portion of such graphs can display or otherwise indicate a summary of average, minimum, and maximum metric values. Also, the state of the anomaly analysis is as provided, wherein such "states" can include, for example, none, high, low, high and low, and learning. The learning state, for example, can be a result of not having enough historical data to perform the analysis.

Figure 4:
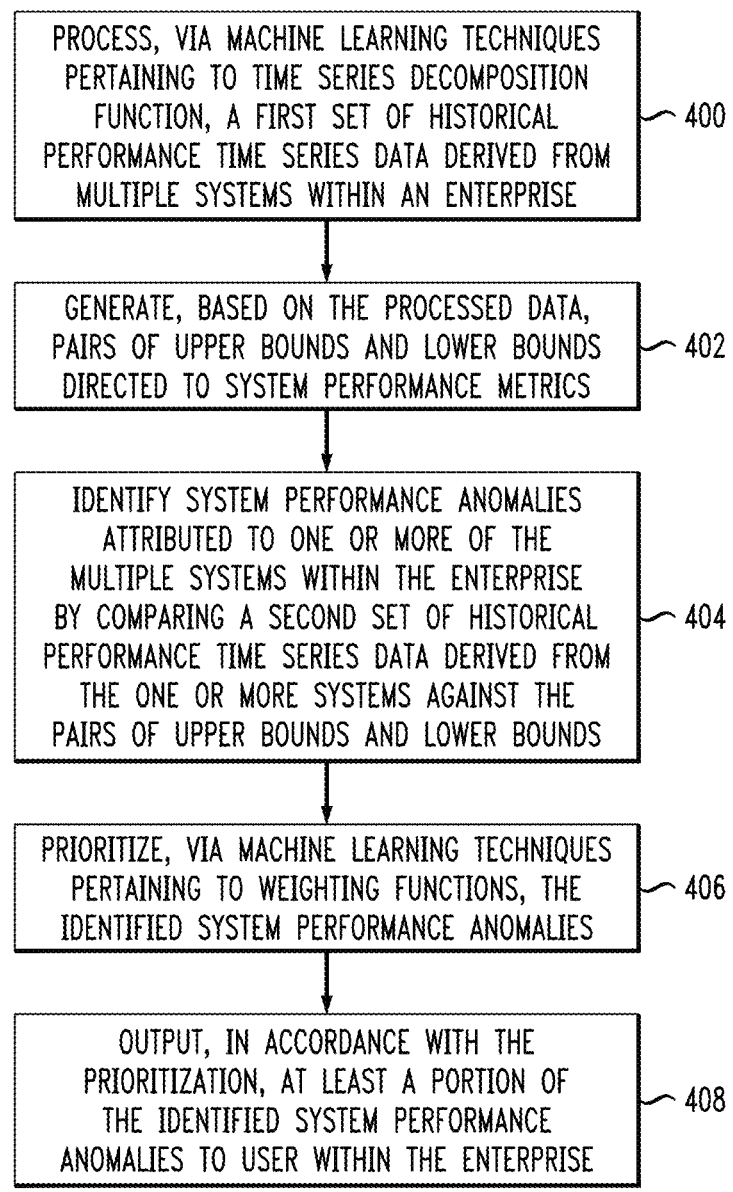
FIG. 4 is a flow diagram of a process for machine learning-based anomaly detection using time series decomposition in an illustrative embodiment.

FIG. 4 is a flow diagram of a process for machine learning-based anomaly detection using time series decomposition in an illustrative embodiment. It is to be understood that this particular process is only an example, and additional or alternative processes can be carried out in other embodiments.

In this embodiment, the process includes steps 400 through 408. These steps are assumed to be performed by the anomaly detection system 105 utilizing its modules 107, 109 and 111.

Step 400 includes processing, via one or more machine learning techniques pertaining to at least one time series decomposition function, a first set of historical time series data derived from multiple systems within an enterprise, wherein the first set of historical time series data encompasses a first temporal period. In at least one embodiment, the one or more machine learning techniques pertaining to at least one time series decomposition function are configured to isolate, from the first set of historical time series data, seasonality values, trend values, and error components. In such an embodiment, generating the one or more pairs of upper bounds and lower bounds includes combining the seasonality values, trend values, and error components.

Additionally, in one or more embodiments, processing the first set of historical time series data includes implementing one or more data cleaning techniques, wherein the one or more data cleaning techniques can include one or more interpolation functions.

Step 402 includes generating, based at least in part on the processed first set of historical time series data, one or more pairs of upper bounds and lower bounds directed to one or more system metrics, wherein each upper bound and lower bound pair defines a range for a given one of the system metrics over the first temporal period.

Step 404 includes identifying one or more system anomalies attributed to one or more of the multiple systems within the enterprise by comparing a second set of historical time series data derived from the one or more systems against the one or more pairs of upper bounds and lower bounds, wherein the second set of historical time series data encompasses a second temporal period that is different than the first temporal period. In one or more embodiments, identifying the one or more system anomalies includes determining that one or more portions of the second set of historical time series data exceeds a given one of the upper bound and lower bound pairs. Further, in at least one embodiment, the first set of historical time series data and the second set of historical time series data include data related to storage system data.

Step 406 includes prioritizing, via one or more machine learning techniques pertaining to at least one weighting function, the one or more identified system anomalies. In at least one embodiment, the one or more machine learning techniques pertaining to at least one weighting function are configured to calculate an area value for each of the one or more identified system anomalies, and to generate a weight value for each calculated area value.

Step 408 includes outputting, in accordance with the prioritization, at least a portion of the one or more identified system anomalies to at least one user within the enterprise.

The techniques depicted in FIG. 4 can additionally include forecasting the one or more pairs of upper bounds and lower bounds for a third temporal period that is subsequent in time to the first temporal period and the second temporal period. Such an embodiment also includes identifying one or more system anomalies attributed to one or more of the multiple systems within the enterprise in real-time by comparing a set of real-time time series data derived from the one or more systems against the one or more forecasted pairs of upper bounds and lower bounds.

Further, the techniques depicted in FIG. 4 can also include automatically configuring at least one of the multiple systems within the enterprise in response to the one or more identified system anomalies.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to generate and implement an anomaly detection algorithm that provides upper and lower bounds that define a range for a given data metric. These and other embodiments can effectively enable automated detection and identification of system anomalies.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of a computer system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
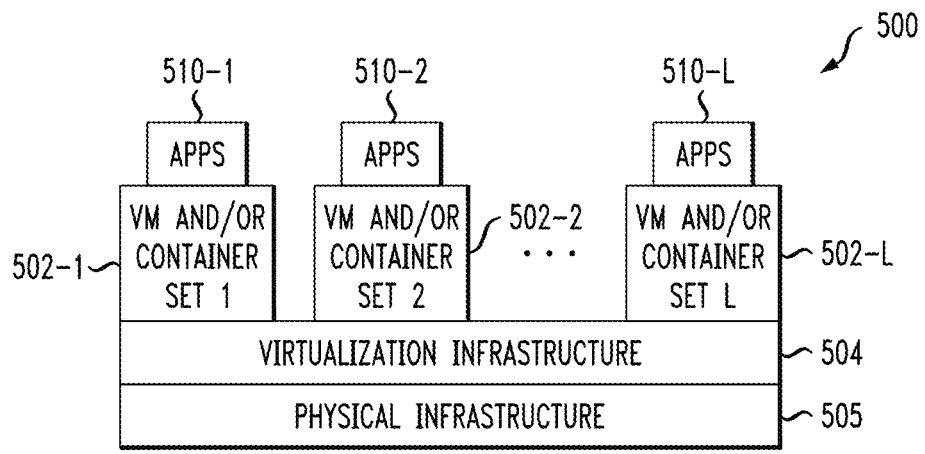
FIGS. 5 and 6 show examples of processing platforms that may be utilized to implement at least a portion of an information processing system in illustrative embodiments.
Figure 6:
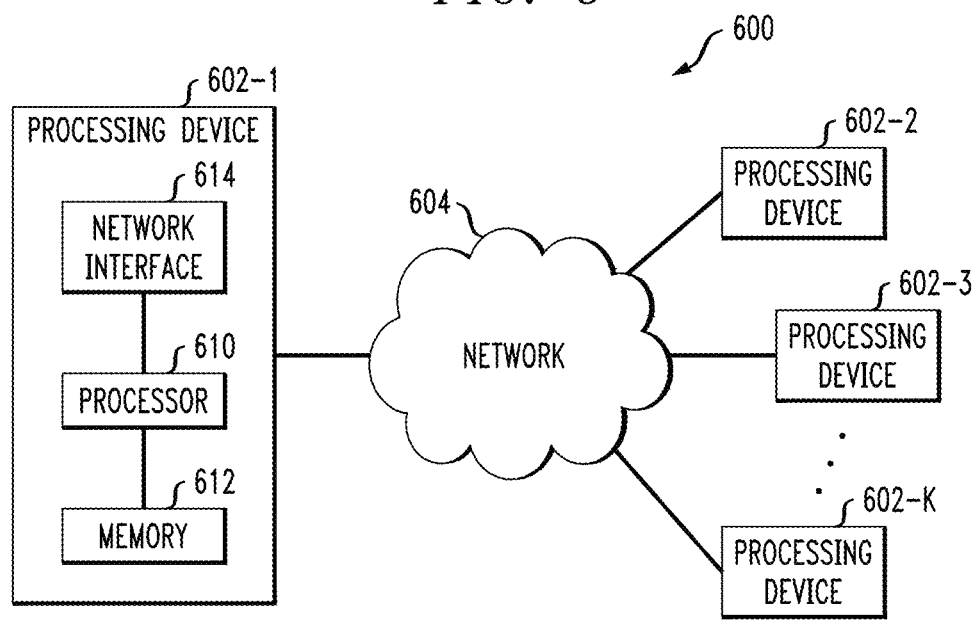

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

An example of a hypervisor platform used to implement a hypervisor within the virtualization infrastructure 504 is the VMware® vSphere® which has an associated virtual infrastructure management system such as the VMware® vCenter™. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
processing, using one or more machine learning techniques comprising at least one time series decomposition function, a first set of historical time series data derived from multiple storage systems within an enterprise, wherein the first set of historical time series data encompasses a first temporal period and wherein processing the first set of historical time series data using the one or more machine learning techniques comprises isolating, from the first set of historical time series data, one or more seasonality values, one or more trend values, and one or more error components;
generating, based at least in part on the processed first set of historical time series data, one or more pairs of upper bounds and lower bounds directed to one or more storage system metrics, wherein each upper bound and lower bound pair defines a range for a given one of the storage system metrics over the first temporal period, and wherein generating the one or more pairs of upper bounds and lower bounds comprises combining at least a portion of the one or more seasonality values, at least a portion of the one or more trend values, and at least a portion of the one or more error components isolated from the first set of historical time series data using the one or more machine learning techniques;

modifying the one or more pairs of upper bounds and lower bounds by shifting the one or more pairs of upper bounds and lower bounds in accordance with at least one standard deviation value associated therewith;

identifying one or more storage system anomalies attributed to one or more of the multiple storage systems within the enterprise by comparing a second set of historical time series data derived from the one or more storage systems against the one or more modified pairs of upper bounds and lower bounds, wherein the second set of historical time series data encompasses a second temporal period that is different than the first temporal period;

prioritizing, using one or more machine learning techniques comprising at least one weighting function, at least one of the one or more identified storage system anomalies, wherein prioritizing comprises:

generating, using the one or more machine learning techniques comprising the at least one weighting function, one or more weight values for the one or more identified storage system anomalies, wherein each weight value corresponds to a level of significance to the one or more storage systems; and prioritizing the at least one of the one or more identified storage system anomalies based at least in part on the one or more weight values;

outputting, in accordance with the prioritization, the at least one of the one or more identified storage system anomalies to at least one user within the enterprise; and performing one or more configuration changes to at least one of the multiple storage systems within the enterprise in response to the one or more identified storage system anomalies;

wherein the method is performed by at least one processing device comprising a processor coupled to a memory; and wherein the one or more machine learning techniques comprising the at least one time series decomposition function and the one or more machine learning techniques comprising the at least one weighting function are implemented by the processor and the memory of the at least processing device.

2. The computer-implemented method of claim 1, further comprising:

forecasting the one or more pairs of upper bounds and lower bounds for a third temporal period that is subsequent in time to the first temporal period and the second temporal period.

3. The computer-implemented method of claim 2, further comprising:

identifying one or more storage system anomalies attributed to one or more of the multiple storage systems within the enterprise in real-time by comparing a set of real-time time series data derived from the one or more storage systems against the one or more forecasted pairs of upper bounds and lower bounds.

4. The computer-implemented method of claim 1, wherein the one or more machine learning techniques comprising the at least one weighting function are configured:

to calculate an area value for each of the one or more identified storage system anomalies; and to generate a weight value for each calculated area value.

5. The computer-implemented method of claim 1, wherein processing the first set of historical time series data comprises implementing one or more data cleaning techniques.

6. The computer-implemented method of claim 5, wherein the one or more data cleaning techniques comprise one or more interpolation functions.

7. The computer-implemented method of claim 1, wherein identifying the one or more storage system anomalies comprises determining that one or more portions of the second set of historical time series data exceeds a given one of the upper bound and lower bound pairs.

8. The computer-implemented method of claim 1, wherein the first set of historical time series data and the second set of historical time series data comprise data related to storage system data.

9. The computer-implemented method of claim 1, further comprising:

associating the one or more identified storage system anomalies with one or more storage system configuration changes using one or more storage system performance graphs associated with the one or more of the multiple storage systems within the enterprise.

10. A non-transitory processor-readable storage medium having stored therein program code of one or more software programs, wherein the program code when executed by at least one processing device, comprising a processor coupled to a memory, causes the at least one processing device:

to process, using one or more machine learning techniques implemented by the processor and the memory of the at least one processing device and comprising at least one time series decomposition function, a first set of historical time series data derived from multiple storage systems within an enterprise, wherein the first set of historical time series data encompasses a first temporal period and wherein processing the first set of historical time series data using the one or more machine learning techniques comprises isolating, from the first set of historical time series data, one or more seasonality values, one or more trend values, and one or more error components;

to generate, based at least in part on the processed first set of historical time series data, one or more pairs of upper bounds and lower bounds directed to one or more storage system metrics, wherein each upper bound and lower bound pair defines a range for a given one of the storage system metrics over the first temporal period, and wherein generating the one or more pairs of upper bounds and lower bounds comprises combining at least a portion of the one or more seasonality values, at least a portion of the one or more trend values, and at least a portion of the one or more error components isolated from the first set of historical time series data using the one or more machine learning techniques;

to modify the one or more pairs of upper bounds and lower bounds by shifting the one or more pairs of upper bounds and lower bounds in accordance with at least one standard deviation value associated therewith;

to identify one or more storage system anomalies attributed to one or more of the multiple storage systems within the enterprise by comparing a second set of historical time series data derived from the one or more storage systems against the one or more modified pairs of upper bounds and lower bounds, wherein the second set of historical time series data encompasses a second temporal period that is different than the first temporal period;

to prioritize, using one or more machine learning techniques implemented by the processor and the memory of the at least one processing device and comprising at least one weighting function, at least one of the one or more identified storage system anomalies, wherein prioritizing comprises:
  generating, using the one or more machine learning techniques implemented by the processor and the memory of the at least one processing device and comprising the at least one weighting function, one or more weight values for the one or more identified storage system anomalies, wherein each weight value corresponds to a level of significance to the one or more storage systems; and
  prioritizing the at least a portion of the one or more identified storage system anomalies based at least in part on the one or more weight values;
to output, in accordance with the prioritization, at least a portion of the one or more identified storage system anomalies to at least one user within the enterprise; and
to perform one or more configuration changes to at least one of the multiple storage systems within the enterprise in response to the one or more identified storage system anomalies.

11. The non-transitory processor-readable storage medium of claim 10, wherein the program code further causes the at least one processing device:
  to forecast the one or more pairs of upper bounds and lower bounds for a third temporal period that is subsequent in time to the first temporal period and the second temporal period.

12. The non-transitory processor-readable storage medium of claim 11, wherein the program code further causes the at least one processing device:
  to identify one or more storage system anomalies attributed to one or more of the multiple storage systems within the enterprise in real-time by comparing a set of real-time time series data derived from the one or more storage systems against the one or more forecasted pairs of upper bounds and lower bounds.

13. The non-transitory processor-readable storage medium of claim 10, wherein the one or more machine learning techniques comprising the at least one weighting function are configured:
  to calculate an area value for each of the one or more identified storage system anomalies; and
  to generate a weight value for each calculated area value.

14. The non-transitory processor-readable storage medium of claim 10, wherein the program code further causes the at least one processing device:
  to associate the one or more identified storage system anomalies with one or more storage system configuration changes using one or more storage system performance graphs associated with the one or more of the multiple storage systems within the enterprise.

15. An apparatus comprising:
at least one processing device comprising a processor coupled to a memory;
the at least one processing device being configured:
  to process, using one or more machine learning techniques implemented by the processor and the memory of the at least one processing device and comprising at least one time series decomposition function, a first set of historical time series data derived from multiple storage systems within an enterprise, wherein the first set of historical time series data encompasses a first temporal period and wherein processing the first set of historical time series data using the one or more machine learning techniques comprises isolating, from the first set of historical time series data, one or more seasonality values, one or more trend values, and one or more error components;
  to generate, based at least in part on the processed first set of historical time series data, one or more pairs of upper bounds and lower bounds directed to one or more storage system metrics, wherein each upper bound and lower bound pair defines a range for a given one of the storage system metrics over the first temporal period, and wherein generating the one or more pairs of upper bounds and lower bounds comprises combining at least a portion of the one or more seasonality values, at least a portion of the one or more trend values, and at least a portion of the one or more error components isolated from the first set of historical time series data using the one or more machine learning techniques;
  to modify the one or more pairs of upper bounds and lower bounds by shifting the one or more pairs of upper bounds and lower bounds in accordance with at least one standard deviation value associated therewith;
  to identify one or more storage system anomalies attributed to one or more of the multiple storage systems within the enterprise by comparing a second set of historical time series data derived from the one or more storage systems against the one or more modified pairs of upper bounds and lower bounds, wherein the second set of historical time series data encompasses a second temporal period that is different than the first temporal period;
  to prioritize, using one or more machine learning techniques implemented by the processor and the memory of the at least one processing device and comprising at least one weighting function, at least one of the one or more identified storage system anomalies, wherein prioritizing comprises:
    generating, using the one or more machine learning techniques implemented by the processor and the memory of the at least one processing device and comprising the at least one weighting function, one or more weight values for the one or more identified storage system anomalies, wherein each weight value corresponds to a level of significance to the one or more storage systems; and
    prioritizing the at least a portion of the one or more identified storage system anomalies based at least in part on the one or more weight values;
  to output, in accordance with the prioritization, at least a portion of the one or more identified storage system anomalies to at least one user within the enterprise; and
  to perform one or more configuration changes to at least one of the multiple storage systems within the enterprise in response to the one or more identified storage system anomalies.

16. The apparatus of claim 15, wherein the at least one processing device is further configured:
  to forecast the one or more pairs of upper bounds and lower bounds for a third temporal period that is subsequent in time to the first temporal period and the second temporal period.

17. The apparatus of claim 16, wherein the at least one processing device is further configured:

to identify one or more storage system anomalies attributed to one or more of the multiple storage systems within the enterprise in real-time by comparing a set of real-time time series data derived from the one or more storage systems against the one or more forecasted pairs of upper bounds and lower bounds.

18. The apparatus of claim 15, wherein the one or more machine learning techniques comprising the at least one weighting function are configured:
- to calculate an area value for each of the one or more identified storage system anomalies; and
- to generate a weight value for each calculated area value.

19. The apparatus of claim 15, wherein identifying the one or more storage system anomalies comprises determining that one or more portions of the second set of historical time series data exceeds a given one of the upper bound and lower bound pairs.

20. The apparatus of claim 15, wherein the at least one processing device is further configured:
- to associate the one or more identified storage system anomalies with one or more storage system configuration changes using one or more storage system performance graphs associated with the one or more of the multiple storage systems within the enterprise.

\* \* \* \* \*